(12) United States Patent
Kameyama

(10) Patent No.: US 6,693,919 B1
(45) Date of Patent: Feb. 17, 2004

(54) FRAME SYNCHRONIZATION METHOD AND FRAME SYNCHRONIZATION CIRCUIT

(75) Inventor: Chihiro Kameyama, Kanagawa (JP)

(73) Assignee: NEC Electronics Corporation, Kanagawa (JP)

(*) Notice: Subject to any disclaimer, the term of this patent is extended or adjusted under 35 U.S.C. 154(b) by 0 days.

(21) Appl. No.: 09/563,719

(22) Filed: May 3, 2000

(30) Foreign Application Priority Data

May 6, 1999 (JP) .......................................... 11-126190

(51) Int. Cl.[7] .................................................. H04J 3/06
(52) U.S. Cl. ....................... 370/503; 307/252; 307/395.1
(58) Field of Search ................................ 370/503, 509, 370/252, 512, 514; 713/400, 395.1

(56) References Cited

U.S. PATENT DOCUMENTS 5,778,214 A * 7/1998 Taya et al. ................... 713/400

FOREIGN PATENT DOCUMENTS

| JP | 3-123228 | 5/1991 |
|---|---|---|
| JP | 3-207135 | 9/1991 |
| JP | 3-235441 | 10/1991 |
| JP | 4-111638 | 4/1992 |
| JP | 4-322533 | 11/1992 |
| JP | 8-214002 | 8/1996 |
| JP | 9-162871 | 6/1997 |
| JP | 2000-165371 | 6/2000 |
| JP | 62-245833 | 10/2001 |

* cited by examiner

Primary Examiner—John Pezzlo
(74) Attorney, Agent, or Firm—Foley & Lardner

(57) ABSTRACT

A frame synchronization circuit has a frame synchronization pattern detecting circuit for detecting a frame synchronization pattern from received frame data and for outputting a pattern detection signal; a frame synchronization state transition managing circuit for managing state transitions; and a frame timing generation circuit for detecting a transition from a hunting state and for generating an enable signal. The frame synchronization state transition managing circuit manages the number of times a frame synchronization pattern is and is not detected, and makes a transition from the hunting state to a synchronization state if the frame synchronization pattern is detected consecutively for a backward protection stage count, and makes a transition from the synchronization state to the hunting state if the frame synchronization pattern is not detected consecutively for a forward protection stage count.

10 Claims, 13 Drawing Sheets

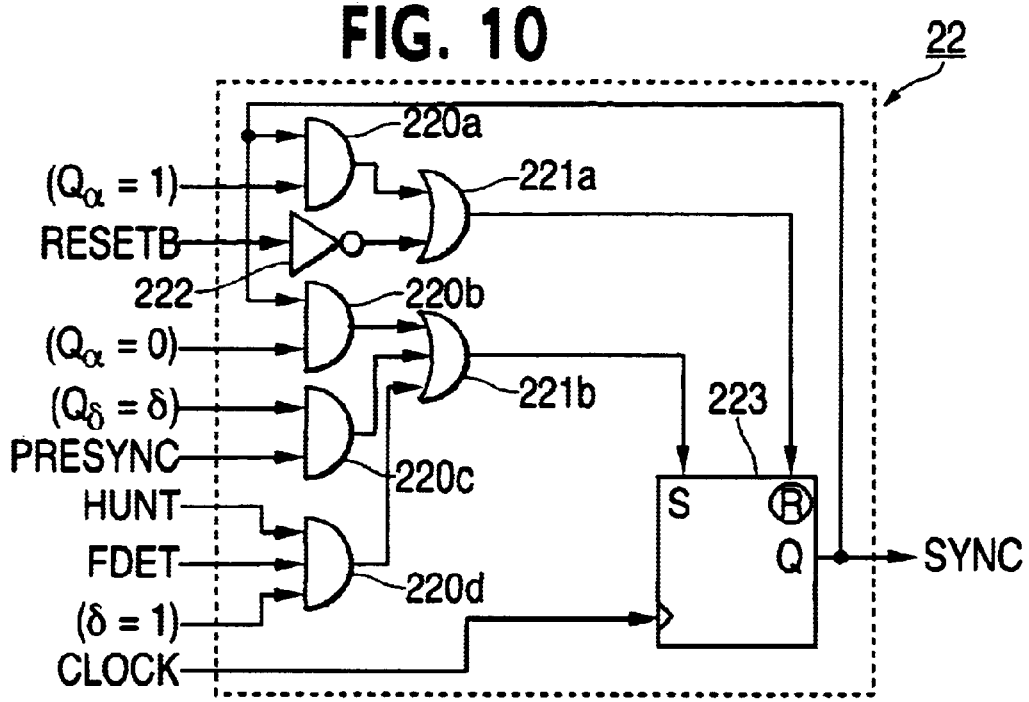
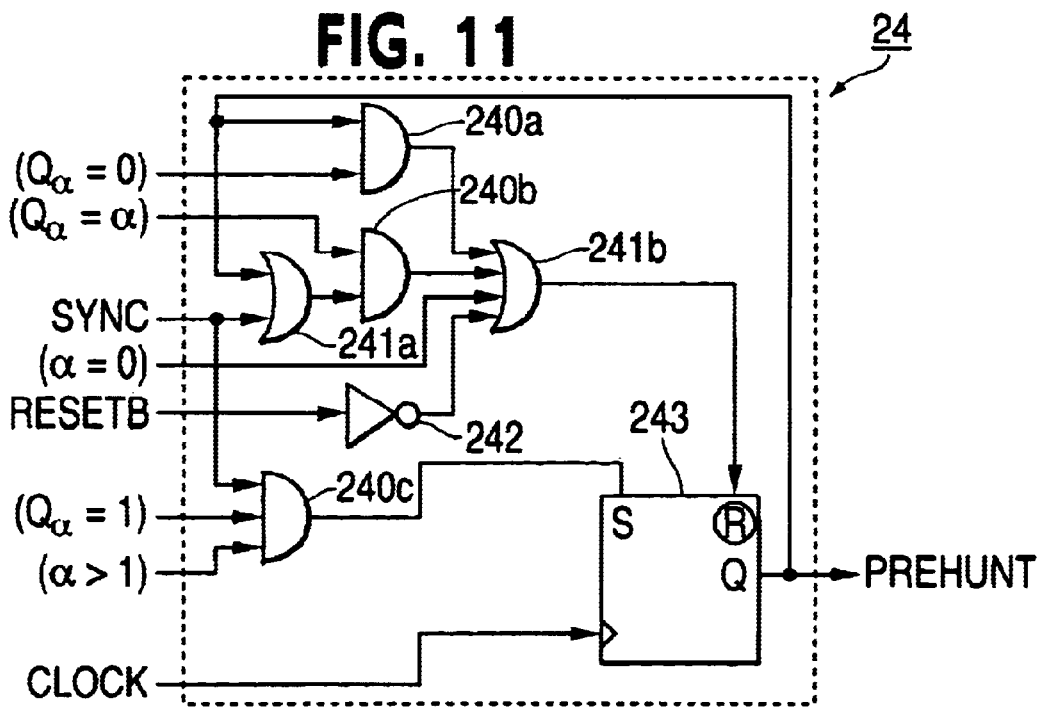

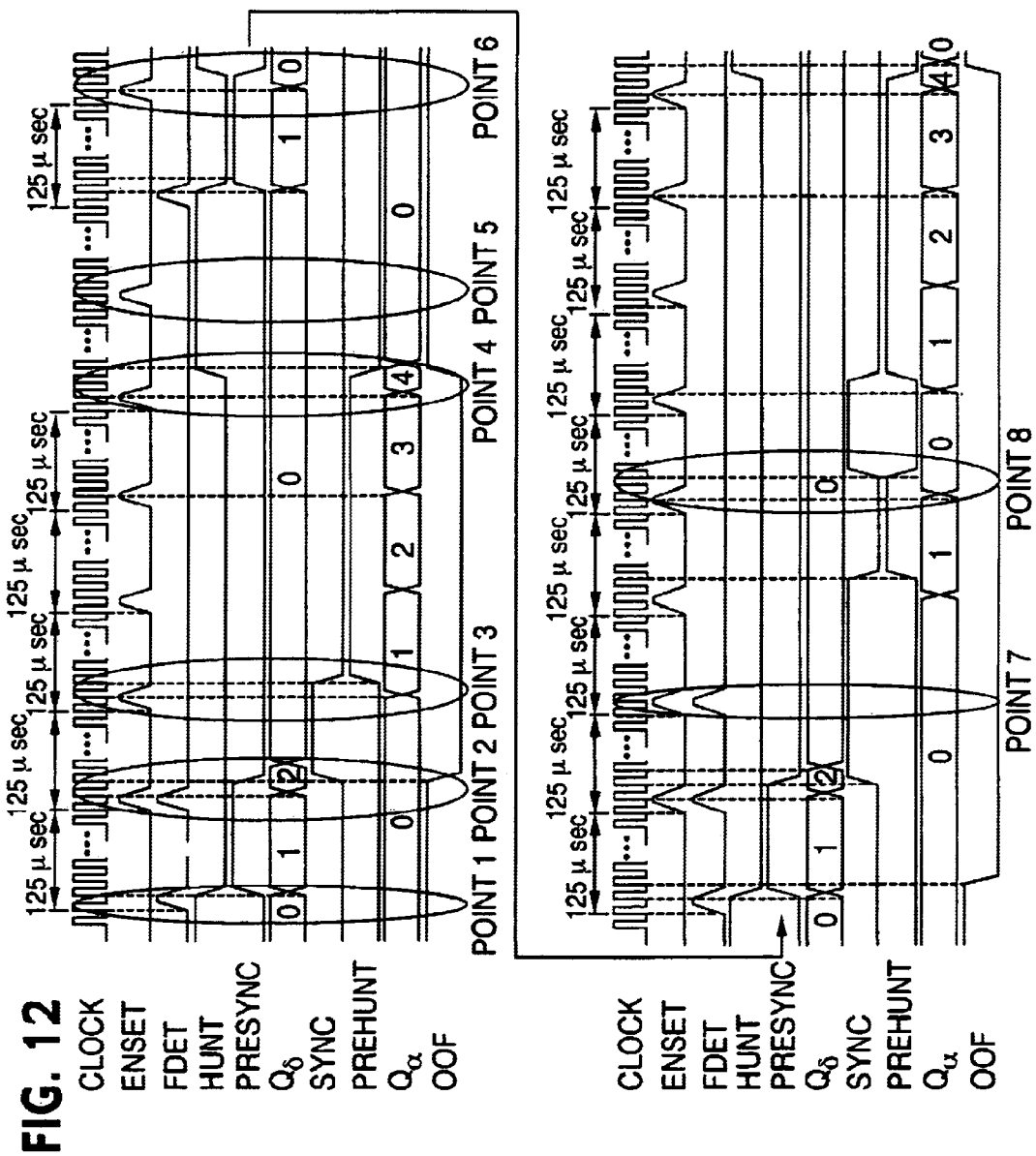

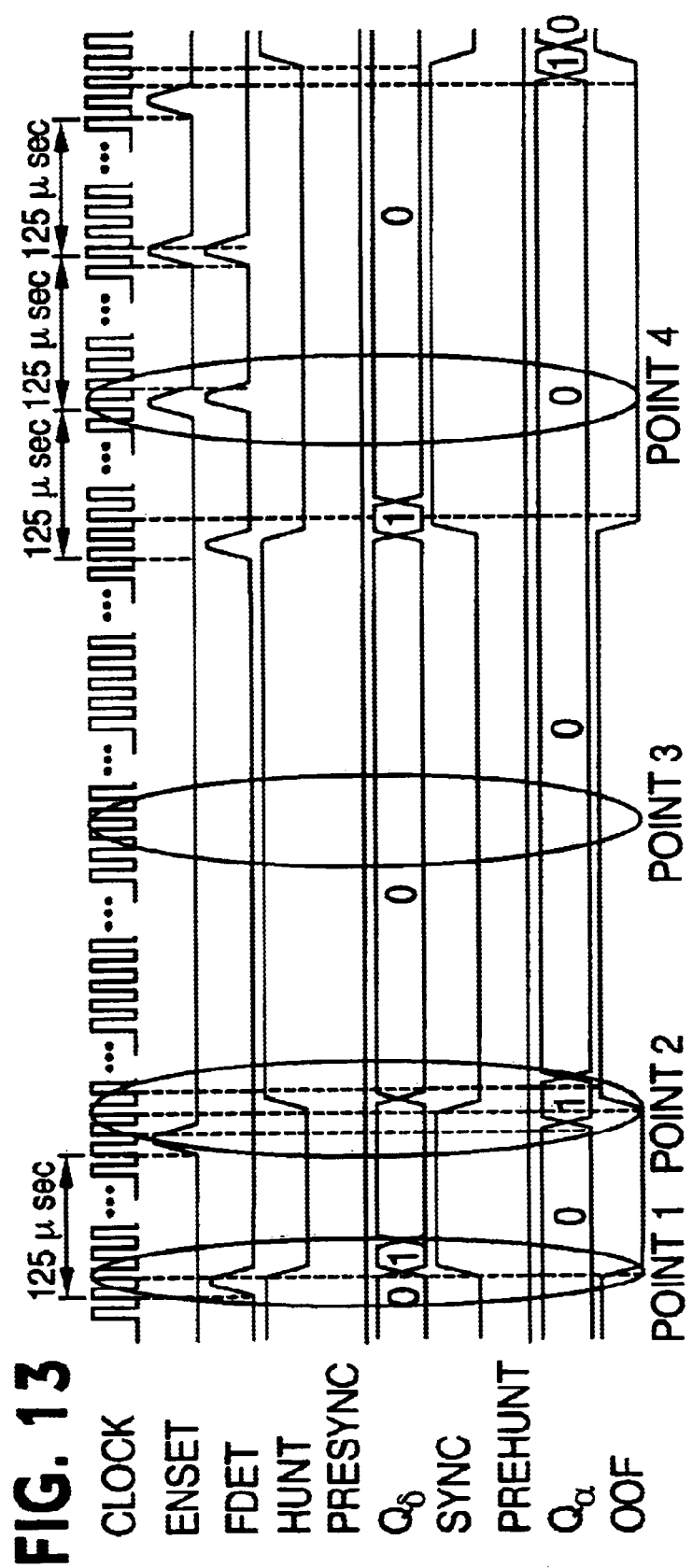

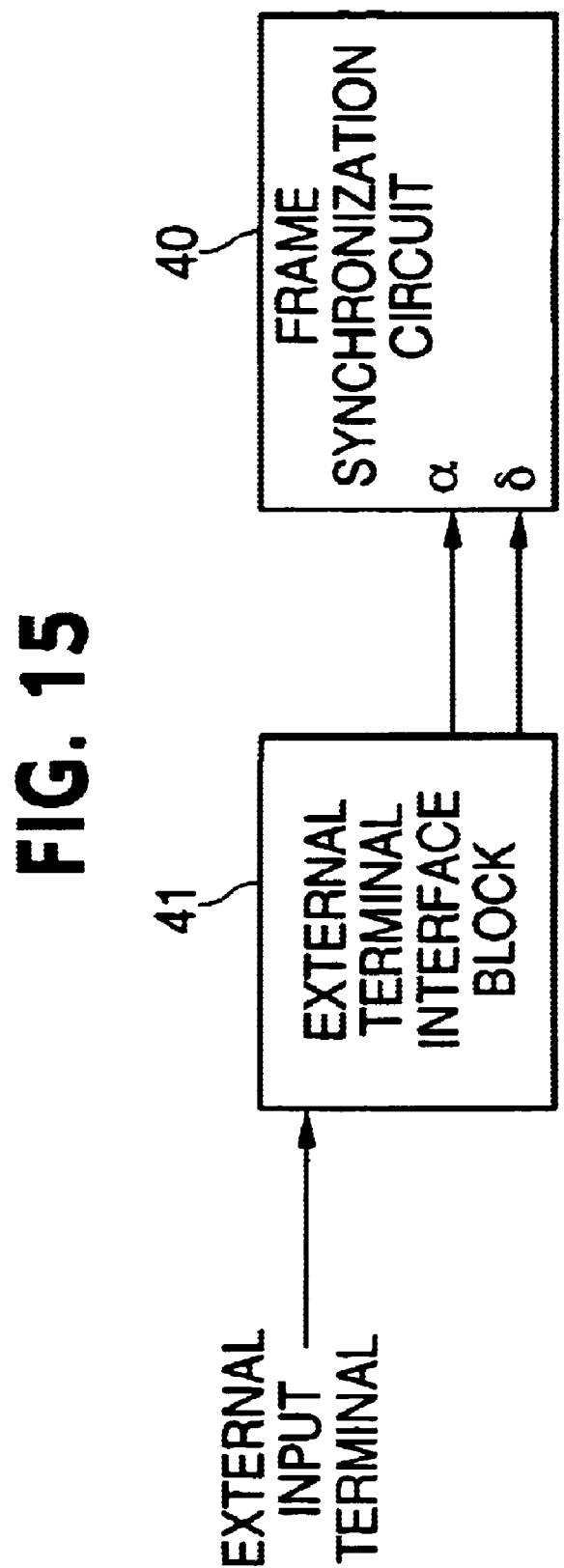

FRAME SYNCHRONIZATION METHOD AND FRAME SYNCHRONIZATION CIRCUIT

BACKGROUND OF THE INVENTION

1. Field of the Invention

The present invention relates to a frame synchronization method and a frame synchronization circuit which are applicable to ATM (Asynchronous Transfer Mode) communications, especially an ATM physical layer protocol.

2. Description of the Prior Art

Data transmission processes for ATM communications include a process for storing ATM cells in transmission frames according to SDH (Synchronous Digital Hierarchy) and transmitting the stored ATM cells, and a process for transmitting ATM cells per se on a transmission path. Frame synchronization according to the former transmission process will be described below by way of example.

An STS (Synchronous Transport Signal)-N frame structure for an ATM physical layer interface is illustrated in FIG. 1 of the accompanying drawings. The STS-N frame has N×90 bytes×9 columns, and comprises two areas, i.e., a transport overhead of 3×N bytes and an STS-N envelope capacity storing ATM cells therein. "N" in the STS-N frame represents a multiplex level.

Frame synchronization patterns A1, A2 indicating the beginning of the frame are set in the transport overhead in the first column of the STS-N frame. Each of the frame synchronization patterns A1, A2 comprises N bytes. If the frame synchronization pattern A1 is set to "F6" and the frame synchronization pattern A2 is set to "28", for example, then a frame synchronization pattern F628[HEX: hexadecimal notation] is established.

FIG. 2 of the accompanying drawings shows frame synchronization state transitions according to a conventional frame synchronization method. A state for establishing synchronization from an out-of-synchronization state is referred to as a HUNT state. In the HUNT state, a received STS-N frame is inspected to ascertain whether the frame synchronization pattern F628[HEX] is detected or not. If the frame synchronization pattern F628[HEX] is detected once from the received STS-N frame, then it is assumed that the beginning of the frame is detected, and a transition occurs from the HUNT state to a PRESYNC state (pre-synchronization state). If the frame synchronization pattern F628[HEX] is not detected, a successively received STS-N frame is inspected.

In the PRESYNC state, a STS-N frame received after the STS-N frame from which the frame synchronization pattern F628[HEX] has been detected in the HUNT state is inspected to ascertain whether the frame synchronization pattern F628[HEX] is consecutively detected at the A1, A2 byte positions. If the frame synchronization pattern F628 [HEX] is consecutively detected at the A1, A2 byte positions, then a transition occurs from the PRESYNC state to a SYNC state (synchronization state). If the frame synchronization pattern F628[HEX] is not detected, then a transition occurs from the PRESYNC state back to the HUNT state.

In the SYNC state, a received STS-N frame is inspected to ascertain whether the frame synchronization pattern F628 [HEX] is detected or not. If the frame synchronization pattern F628[HEX] is not detected at the A1, A2 byte positions., then a transition occurs from the SYNC state to a PREHUNT state (pre-hunting state). If the frame synchronization pattern F628[HEX] is detected at the A1, A2 byte positions, then a successively received STS-N frame is inspected.

In the PREHUNT state, it is inspected whether the frame synchronization pattern F628[HEX] is detected in three consecutive frames at the A1, A2 byte positions or not. If the frame synchronization pattern F628[HEX] is not detected in three consecutive frames, then a transition occurs from the PREHUNT state to the HUNT state. If the frame synchronization pattern F628[HEX] is detected even once, a transition occurs from the PREHUNT state back to the SYNC state (synchronization state).

In the above frame synchronization, it is necessary that the frame synchronization pattern F628[HEX] be detected consecutively twice as a condition to be met in order to enter the SYNC state from the HUNT state via the PRESYNC state, and it is necessary that the frame synchronization pattern F628[HEX] be not detected consecutively four times as a condition to be met in order to enter the HUNT state from the SYNC state via the PREHUNT state. Such conditions for determining synchronization and out-of-synchronization are referred to as backward protection and forward protection, respectively, and the numbers of conditions to be met are referred to as backward protection stage count $\delta$ and forward protection stage count $\alpha$, respectively. In the above conventional frame synchronization, the backward protection stage count $\delta=2$ and the forward protection stage count $\alpha=4$.

If the forward protection stage count $\alpha$ is reduced, then the danger of an erroneous transition to the HUNT state due to a transmission error is increased. If the forward protection stage count $\alpha$ is increased, then the time consumed after synchronization until the HUNT state is reached is increased. If the backward protection stage count $\delta$ is reduced, then the danger of an erroneous detection of a frame synchronization pattern is increased. If the backward protection stage count $\delta$ is increased, then the probability of a return to the HUNT state is increased.

It is preferable that the user be allowed to set the backward protection stage count $\delta$ and the forward protection stage count $\alpha$ to arbitrary values in view of their characteristics described above. Heretofore, however, the backward protection stage count $\delta$ and the forward protection stage count $\alpha$ are fixed to $\delta=2$, $\alpha=4$, and the user is unable to set these counts to arbitrary values. If transitions from the HUNT state via the PRESYNC state to the SYNC state and then from the SYNC state via the PREHUNT state to the HUNT-state are carried out in actual operation, 6 frames (125 $\mu$sec.×6 frames=750 $\mu$sec.) are required at a minimum, and the user cannot shorten this period of time.

Japanese laid-open patent publication No. 8-214002 discloses a frame synchronization process which has one forward protection stage and one backward protection stage for frame synchronization with respect to an EMSD (Extended Maintenance Signal Driver) highway. According the disclosed frame synchronization process, if a normal synchronization FCK is received in the hunting state, data start to be read from a corresponding frame. If an abnormal synchronization FCK is received even once in the synchronization state, then a transition occurs from the synchronization state to the hunting state. Data from that time on are discarded, and the data received immediately prior to that time is maintained until synchronization is established next time. According the disclosed frame synchronization process, however, the user is unable to set the backward protection stage count $\delta$ and the forward protection stage count $\alpha$ to arbitrary values.

SUMMARY OF THE INVENTION

It is therefore an object of the present invention to provide a frame synchronization method and a frame synchronization circuit which allow the user to set the backward protection stage count δ and the forward protection stage count α to arbitrary values.

To achieve the above object, there is provided in accordance with the present invention a method of achieving frame synchronization for received frame data with a predetermined frame synchronization pattern inserted in the beginning of each of transmission frames containing ATM cells in a frame synchronization circuit, comprising the steps of detecting the frame synchronization pattern from the received frame data, generating a first pulse signal of one clock pulse in timed relationship to the detection of the frame synchronization pattern from the received frame data, detecting a transition from a hunting state to one of pre-synchronization state, a synchronization state, and a pre-hunting state for frame synchronization of the frame synchronization circuit, generating a second pulse signal in a period corresponding to a frame period of the received frame data in timed relationship to the detection of the transition, managing the number of times that the frame synchronization pattern is detected and the number of times that the frame synchronization pattern is not detected, based on the first pulse signal and the second pulse signal, making a transition from the hunting state to the synchronization state if the frame synchronization pattern is detected consecutively for a backward protection stage count which is voluntarily set up as a protection condition to be met in order to change from the hunting state to the synchronization state, and making a transition from the synchronization state to the hunting state if the frame synchronization pattern is not detected consecutively for a forward protection stage count which is voluntarily set up as a protection condition to be met in order to change from the synchronization state to the hunting state.

According to the present invention, there is also provided a frame synchronization circuit for achieving frame synchronization for received frame data with a predetermined frame synchronization pattern inserted in the beginning of each of transmission frames containing ATM cells, comprising frame synchronization pattern detecting means for detecting the frame synchronization pattern from the received frame data and generating a first pulse signal of one clock pulse in timed relationship to the detection of the frame synchronization pattern from the received frame data, frame synchronization state transition managing means for managing frame synchronization state transitions, and frame timing generating means for detecting a transition from a hunting state to another state for frame synchronization, and generating a second pulse signal in a period corresponding to a frame period of the received frame data in timed relationship to the detection of the transition, the frame synchronization state transition managing means comprising means for managing the number of times that the frame synchronization pattern is detected and the number of times that the frame synchronization pattern is not detected, based on the first pulse signal and the second pulse signal, and making a transition from the hunting state to a synchronization state if the frame synchronization pattern is detected consecutively for a backward protection stage count which is voluntarily set up as a protection condition to be met in order to change from the hunting state to the synchronization state, and making a transition from the synchronization state to the hunting state if the frame synchronization pattern is not detected consecutively for a forward protection stage count which is voluntarily set up as a protection condition to be met in order to change from the synchronization state to the hunting state.

With the arrangement of the present invention, certain conditions need to be met for a transition from the hunting state to the synchronization state and a transition from the synchronization state to the hunting state depending on the backward protection stage count and the forward protection stage count. The backward protection stage count and the forward protection stage count can be set to arbitrary values by the user. For example, the user can set each of the backward protection stage count and the forward protection stage count to "1". The period of time required in actual operation to effect a transition from the hunting state via the pre-synchronization state to the synchronization state and from the synchronization state via the pre-hunting state to the hunting state may be 2 frames (125 μsec.×2 frames=250 μsec.). Since the same period of time has heretofore been 6 frames, the period of time is reduced to one-third according to the present invention. Because four frames are eliminated, an amount of data represented by 48×90×9 (bytes/frame)×4 frames=155,520 (bytes) can be eliminated at a maximum (STM-16 for SDH and OC-48 for SONET).

The above and other objects, features, and advantages of the present invention will become apparent from the following description with reference to the accompanying drawings which illustrate examples of the present invention.

BRIEF DESCRIPTION OF THE DRAWINGS

FIG. 10 is a block diagram of a synchronization state signal output circuit in the frame synchronization state transition management circuit shown in FIG. 5;

FIG. 11 is a block diagram of a pre-hunting state signal output circuit in the frame synchronization state transition management circuit shown in FIG. 5;

FIG. 12 is a timing chart of the output timing of state transition signals HUNT, PRESYNC, SYNC, PREHUNT;

FIG. 13 is a timing chart of the output timing of state transition signals HUNT, PRESYNC, SYNC, PREHUNT;

FIG. 15 is a block diagram of another system in which a forward protection stage count α and a backward protection stage count δ can be set up.

DESCRIPTION OF THE PREFERRED EMBODIMENTS

Figure 1:
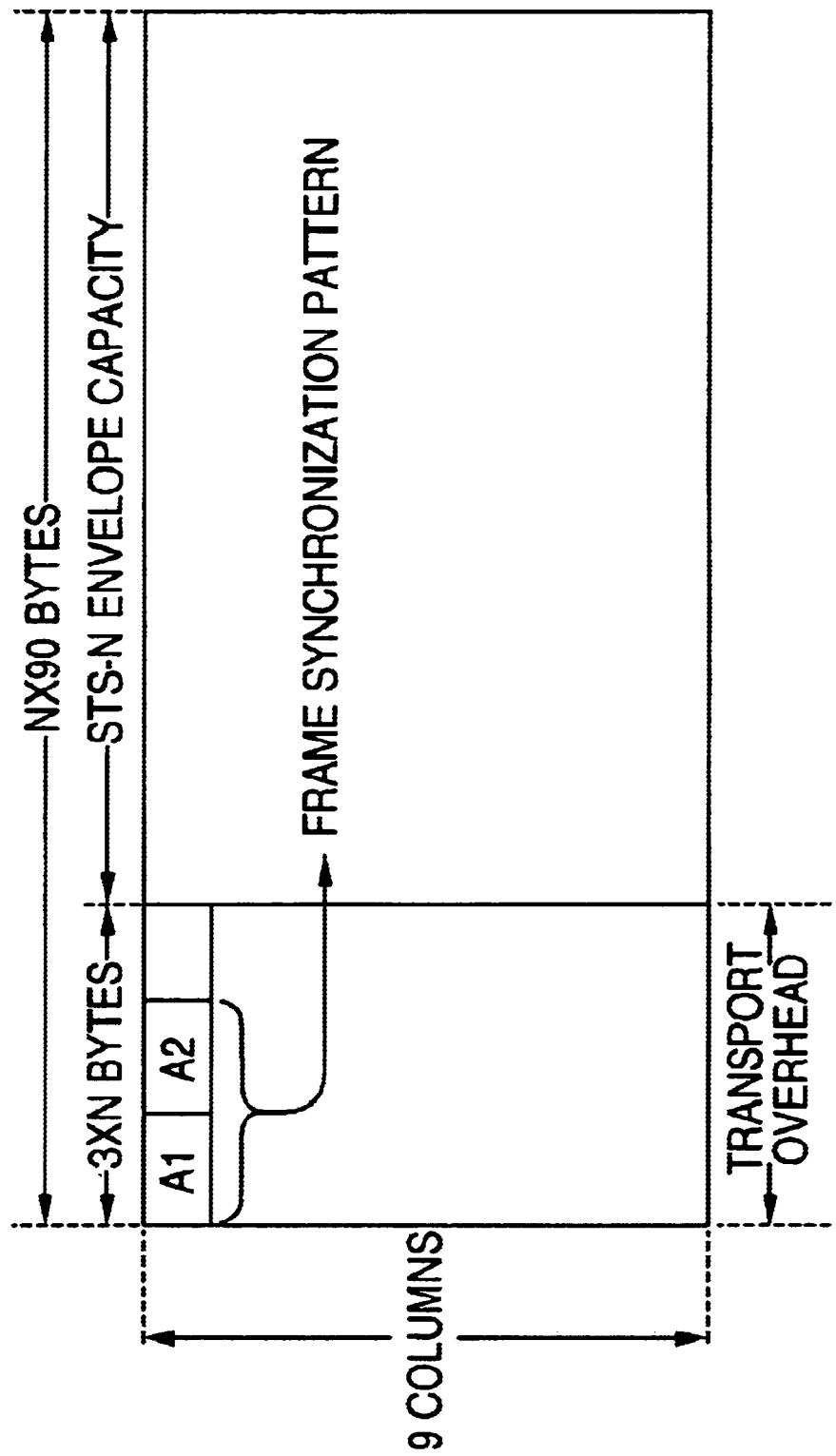
FIG. 1 is a diagram showing an STS-N frame structure for an ATM physical layer interface.
Figure 2:
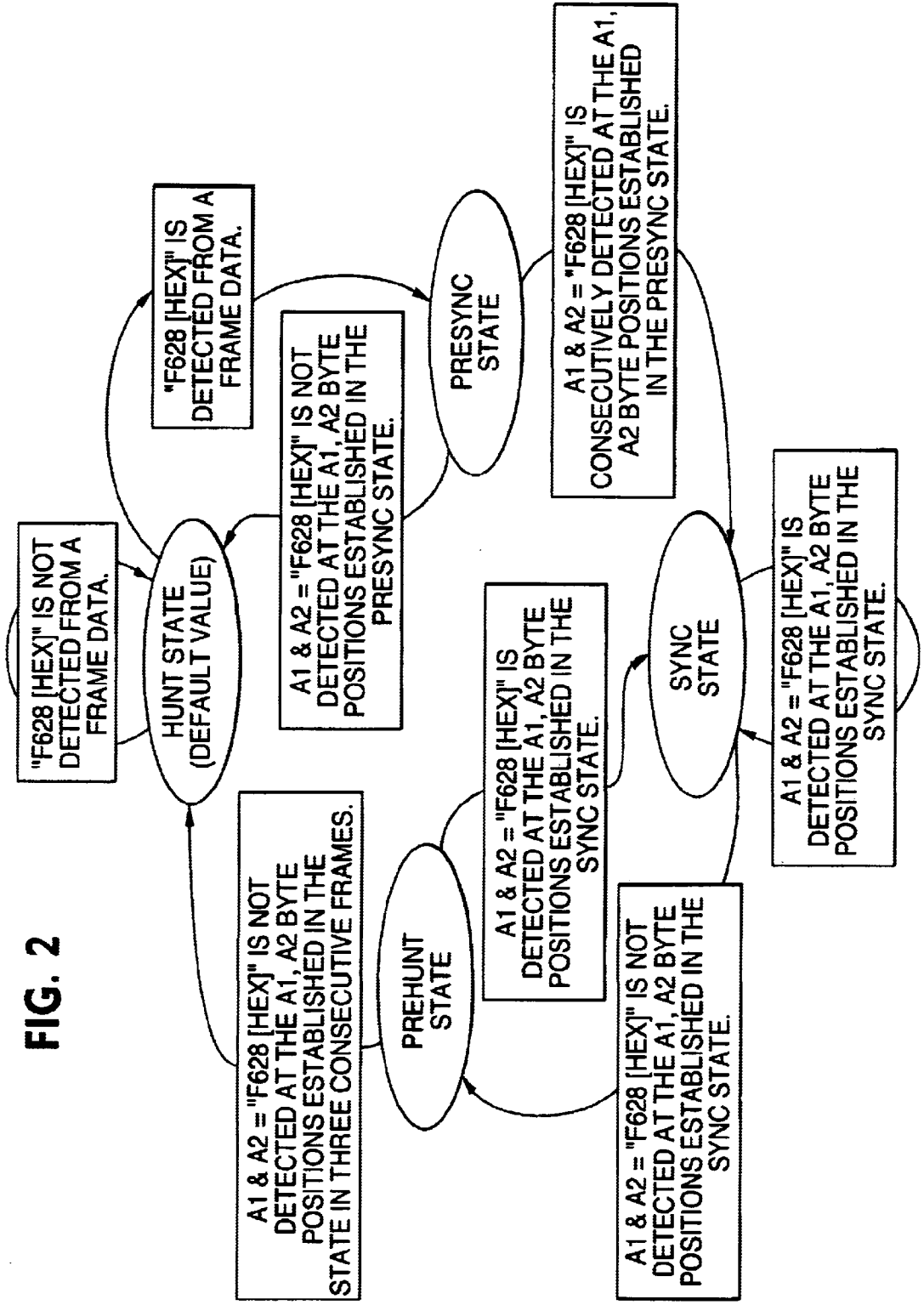
FIG. 2 is a diagram showing transitions between frame synchronization states according to a conventional frame synchronization process.
Figure 3:
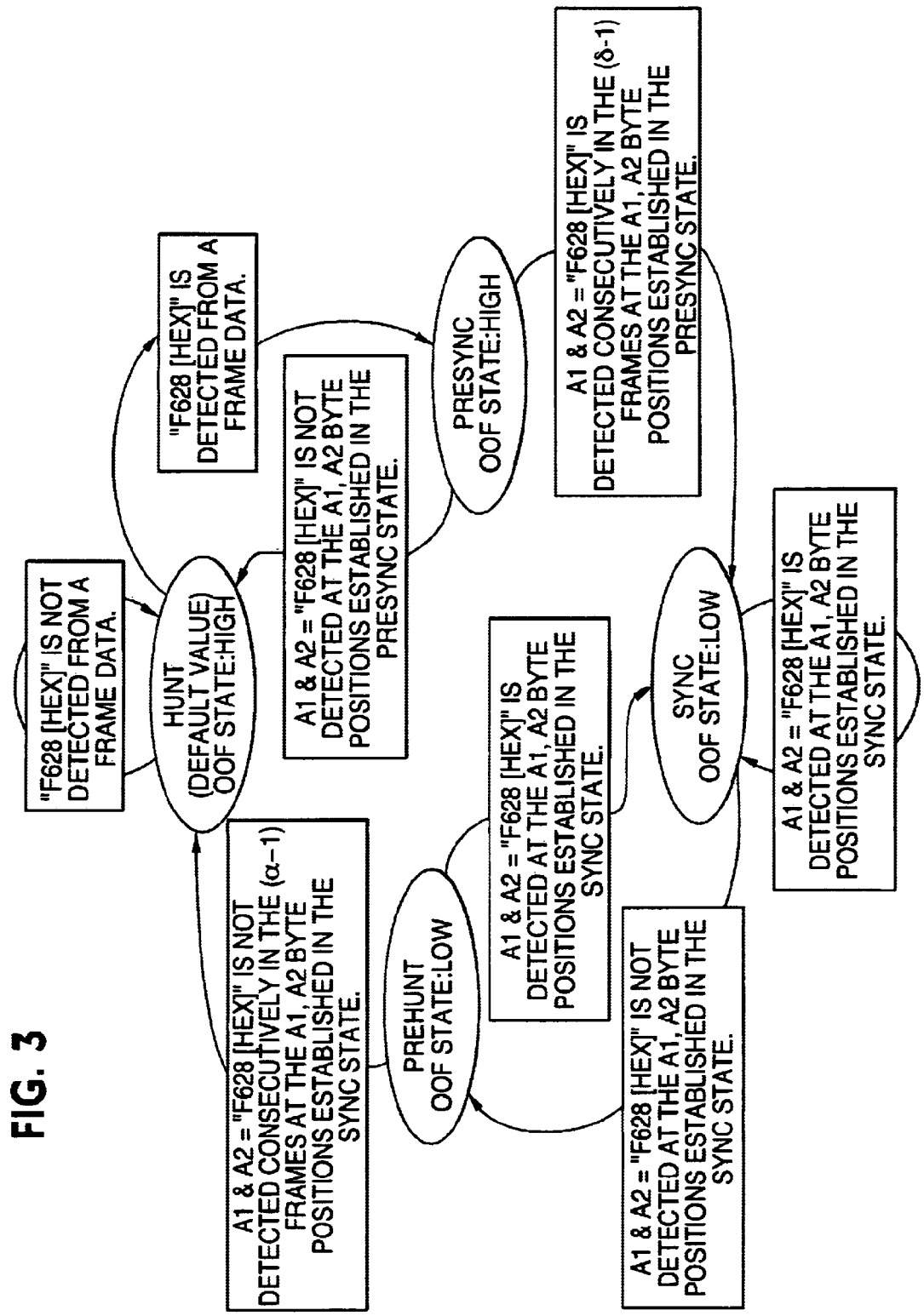
FIG. 3 is a diagram showing transitions between frame synchronization states carried out by a frame synchronization circuit shown in FIG. 4.

According to the present invention, the user is allowed to set a forward protection stage count α and a backward protection stage count δ to arbitrary values in frame synchronization state transitions in a system for performing communications with frame data of an ATM physical layer interface, specifically, the STS-N frame structure shown in FIG. 1. FIG. 3 shows transitions between frame synchronization states carried out by a frame synchronization circuit according to the present invention. In the description which follows, it is assumed that in the transport overhead in the first column of each STS-N frame, the frame synchronization pattern A1 is set to "F6" and the frame synchronization pattern A2 is set to "28", i.e., a frame synchronization pattern F628[HEX] is established.

In the HUNT state (hunting state: synchronization is to be established from the out-of-synchronization state), if the frame synchronization pattern F628[HEX] is detected once from a received STS-N frame, then it is assumed that the beginning of the frame is detected, and a transition occurs from the HUNT state to the PRESYNC state (pre-synchronization stage). If the frame synchronization pattern F628[HEX] is not detected, then a successively received STS-N frame is inspected to ascertain whether the frame synchronization pattern F628[HEX] is not or detected.

In the PRESYNC state, it is determined whether the frame synchronization pattern F628[HEX] is detected at the A1, A2 byte positions consecutively in as many frames as the difference between an arbitrarily established backward protection stage count δ and 1, i.e., (δ−1) frames, or not from a frame received after the frame from which the frame synchronization pattern F628[HEX] has been detected in the HUNT state. If the frame synchronization pattern F628[HEX] is detected at the A1, A2 byte positions consecutively in the (δ−1) frames, then a transition occurs from the PRESYNC state to a SYNC state (synchronization state). If the frame synchronization pattern F628[HEX] is not detected, then a transition occurs from the PRESYNC state back to the hunting state.

In the SYNC state, a received STS-N frame is inspected to ascertain whether the frame synchronization pattern F628[HEX] is detected at the A1, A2 byte positions. If the frame synchronization pattern F628[HEX] is not detected even once, then a transition occurs from the SYNC state to a PREHUNT state (pre-hunting state).

In the PREHUNT state, it is determined whether the frame synchronization pattern F628[HEX] is not detected at the A1, A2 byte positions consecutively in as many frames as the difference between an arbitrarily established backward protection stage count α and 1, i.e., (α−1) frames, from a frame received following the frame from which the frame synchronization pattern F628[HEX] has been detected in the SYNC state. If the frame synchronization pattern F628[HEX] is not detected at the A1, A2 byte positions consecutively in the (α−1) frames, then a transition occurs from the PREHUNT state to the HUNT state. If the frame synchronization pattern F628[HEX] is detected even once, then a transition occurs from the PREHUNT state back to the SYNC state.

As described above, for frame synchronization state transitions according to the present embodiment, it is necessary that the frame synchronization pattern F628[HEX] be detected consecutively δ times as a condition to be met in order to enter the SYNC state from the HUNT state via the PRESYNC state, and it is necessary that the frame synchronization pattern F628[HEX] be not detected consecutively α times as a condition to be met in order to enter the HUNT state from the SYNC state via the PREHUNT state.

Specific details of a frame synchronization circuit for achieving the above frame synchronization state transitions will be described below.

Figure 4:
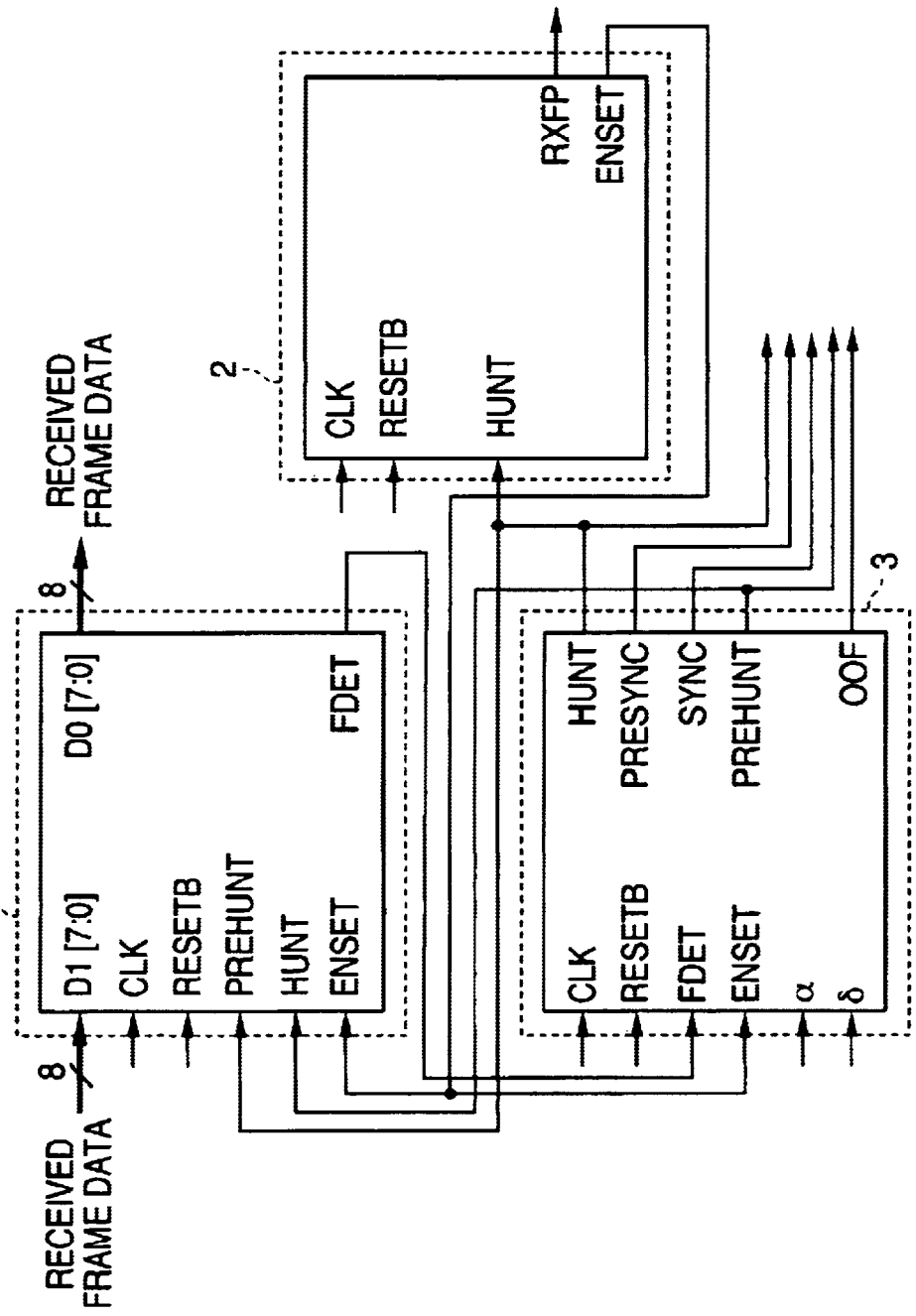
FIG. 4 is a block diagram of major components of a frame synchronization circuit according to an embodiment of the present invention.

FIG. 4 shows major components of a frame synchronization circuit according to the present embodiment of the present invention. The frame synchronization circuit is incorporated in a reception terminal and comprises a frame synchronization pattern detecting circuit 1, a frame timing generating circuit 2, and a frame synchronization state transition managing circuit 3.

The frame synchronization pattern detecting circuit 1 has an input terminal D1 [7:1] to which received frame data (the STS-N frame data) is supplied and an output terminal D0 [7:1] from which the received frame data is output. The frame synchronization pattern detecting circuit 1 inspects the received frame data to ascertain whether a frame synchronization pattern (F628[HEX] set in A1, A2) is or not detected. If the frame synchronization pattern detecting circuit 1 detects the frame synchronization pattern, then it outputs a frame synchronization pattern detection signal FDET, which is supplied to the frame synchronization state transition managing circuit 3. Specifically, when the frame synchronization pattern is detected, the frame synchronization pattern detection signal FDET is made active, and supplied as one clock pulse to the frame synchronization state transition managing circuit 3.

Based on the frame synchronization pattern detection signal FDET supplied from the frame synchronization pattern detecting circuit 1, the frame synchronization state transition managing circuit 3 manages frame synchronization state transitions in the frame synchronization circuit, and generates a HUNT signal, a PRESYNC signal, a SYNC signal, and a PREHUNT signal which represent the HUNT state, the PRESYNC state, the SYNC state, and the PREHUNT state, respectively. If the frame synchronization circuit is in an out-of-synchronization state, then the frame synchronization state transition managing circuit 3 generates a frame-out-of-synchronization signal OOF. The frame synchronization state transition managing circuit 3 is capable of setting the backward protection stage count δ and the forward protection stage count α to respective arbitrary values.

The frame timing generating circuit 2, to which a HUNT signal is supplied from the frame synchronization state transition managing circuit 3, detects the switching of the HUNT signal to an inactive state. When the frame timing generating circuit 2 detects the switching of the HUNT signal to the inactive state, the frame timing generating circuit 2 generates one clock pulse in every 125 μsec. and outputs it as a frame timing signal RXFP and an enable signal ENSET. Each of the frame timing signal RXFP and the enable signal ENSET is generated in a period corresponding to the frame period of the received frame data 8.

Figure 5:
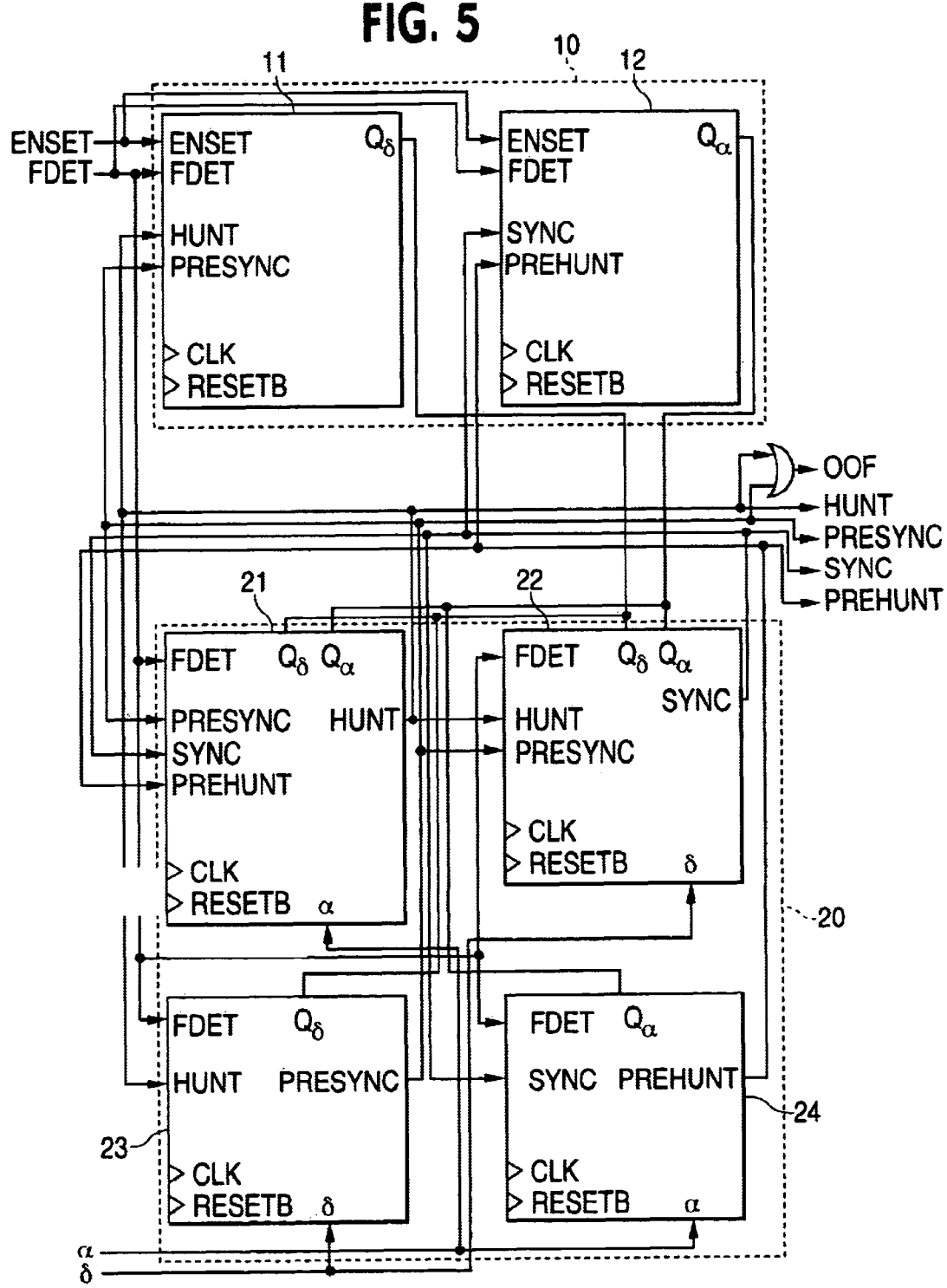
FIG. 5 is a block diagram of a frame synchronization state transition managing circuit in the frame synchronization circuit shown in FIG. 4.

In the frame synchronization circuit, the frame synchronization state transition managing circuit 3 manages the number of times that the frame synchronization pattern is detected and the number of times that the frame synchronization pattern is not detected, based on the enable signal ENSET and the frame synchronization pattern detection signal FDET, makes a transition from the hunting state to the synchronization state if the frame synchronization pattern is detected consecutively for an established backward protection stage count δ, and makes a transition from the synchronization state to the hunting state if the frame synchronization pattern is not detected consecutively for an established forward protection stage count α. Therefore, the frame synchronization state transition managing circuit 3 carries out the frame synchronization state transitions as shown in FIG. 3 depending on the forward protection stage count α and the backward protection stage count δ. FIG. 5 shows specific details of the frame synchronization state transition managing circuit 3.

As shown in FIG. 5, the frame synchronization state transition managing circuit 3 comprises a counter block 10 and a state transition block 20. The counter block 10 comprises a backward protection stage count δ management counter 11 and a forward protection stage count α management counter 12. The state transition block 20 comprises a hunting state signal output circuit 21, a synchronization state signal output circuit 22, a pre-synchronization state signal output circuit 23, and a pre-hunting state signal output circuit 24.

Arrangement of the Counter Block 10:

The backward protection stage count δ management counter 11 is a counter for managing the value of the backward protection stage count δ for a transition from the HUNT state to the SYNC state. The backward protection stage count δ management counter 11 is supplied with the frame synchronization pattern detection signal FDET from the frame synchronization pattern detecting circuit 1, the enable signal ENSET from the frame timing generating circuit 2, a hunting state signal HUNT from the hunting state signal output circuit 21, and a pre-synchronization state signal PRESYNC from the pre-synchronization state signal output circuit 23. The backward protection stage count δ management counter 11 supplies a count value $Q_\delta$ (whose initial value is 0) to the hunting state signal output circuit 21, the synchronization state signal output circuit 22, and the pre-synchronization state signal output circuit 23. If the backward protection stage count δ management counter 11 detects when the frame synchronization pattern detection signal FDET goes active (FDET=1) in the HUNT state or when the logical product of the frame synchronization pattern detection signal FDET and the enable signal ENSET becomes "1" (FDET & ENSET=1) in the PRESYNC state, the backward protection stage count δ management counter 11 increments the count value $Q_\delta$. The backward protection stage count δ management counter 11 is reset if it detects when the logical product of the frame synchronization pattern detection signal FDET (negative) and the enable signal ENSET becomes "1" (not FDET & ENSET=1) in the PRESYNC state. The backward protection stage count δ management counter 11 is also reset when not in the HUNT state or the PRESYNC state or when a system reset signal RESETB is "0".

Figure 6:
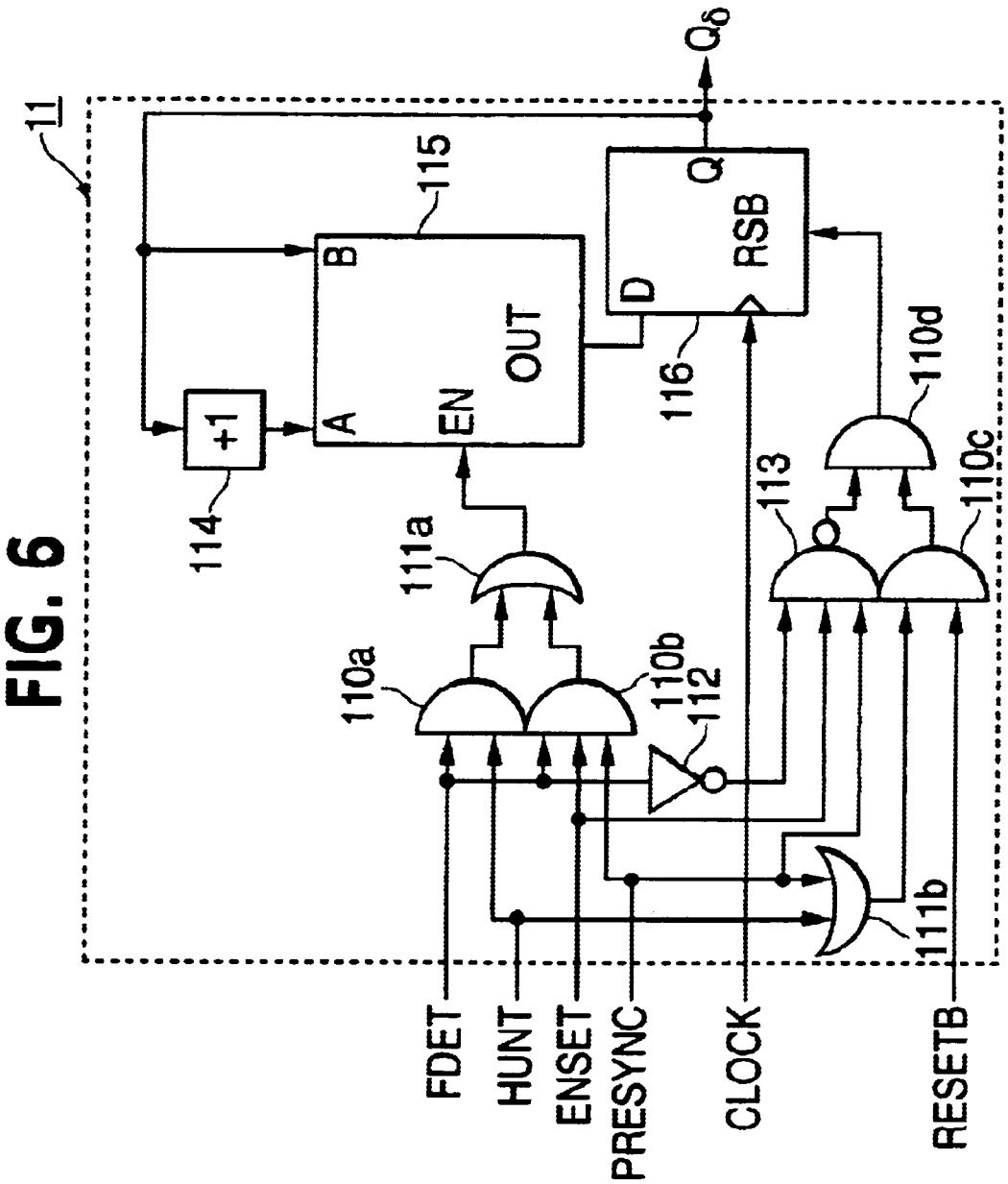
FIG. 6 is a block diagram of a backward protection stage count δ management counter in the frame synchronization state transition management circuit shown in FIG. 5.

Specific details of the backward protection stage count δ management counter 11 are shown in FIG. 6. As shown in FIG. 6, the backward protection stage count δ management counter 11 comprises AND gates 110a–110d, OR gates 111a, 111b, an inverter 112, a NAND gate 113, a counter 114, a selector 115, and a data flip-flop 116 with a reset terminal.

The AND gate 110a ANDs the frame synchronization pattern detection signal FDET and the hunting state signal HUNT. The AND gate 110b ANDs the frame synchronization pattern detection signal FDET, the enable signal ENSET, and the pre-synchronization state signal PRESYNC. The OR gate 111a has an input terminal supplied with an output signal from the AND gate 110a and another input terminal supplied with an output signal from the AND gate 110b, and ORs these supplied signals. The OR gate 111a supplies its output signal to an input terminal EN of the selector 115.

The OR gate 111b ORs the hunting state signal HUNT and the pre-synchronization state signal PRESYNC. The AND gate 110c ANDs an output signal from the OR gate 111b and the system reset signal RESETB. The NAND gate 113 NANDs an output signal, which in inverse relation to the frame synchronization pattern detection signal FDET, from the inverter 112, the enable signal ENSET, and the pre-synchronization state signal PRESYNC. The AND gate 110d ANDs an output signal from the AND gate 110c and an output signal from the NAND gate 113.

The selector 115 has an input terminal A supplied with an output signal Q from the data flip-flop 116 via the counter 114 and an input terminal B supplied with the output signal Q from the data flip-flop 116. The data flip-flop 116 has an input terminal D supplied with an output from the selector 115 and an input terminal RSB supplied with an output signal from the AND gate 110d. The output signal Q from the data flip-flop 116 is outputted as the count value $Q_\delta$.

The forward protection stage count α management counter 12 is a counter for managing the value of the forward protection stage count α for a transition from the SYNC state to the HUNT state. The forward protection stage count α management counter 12 is supplied with the frame synchronization pattern detection signal FDET from the frame synchronization pattern detecting circuit 1, the enable signal ENSET from the frame timing generating circuit 2, a synchronization state signal SYNC from the synchronization state signal output circuit 22, and a pre-hunting state signal PREHUNT from the pre-hunting state signal output circuit 24. The forward protection stage count α management counter 12 supplies a count value $Q_\alpha$ (whose initial value is 0) to the hunting state signal output circuit 21, the synchronization state signal output circuit 22, and the pre-hunting state signal output circuit 24. If the forward protection stage count α management counter 12 detects when the logical product of the frame synchronization pattern detection signal FDET (negative) and the enable signal ENSET becomes "1" (not FDET & ENSET=1) in the SYNC state or the PREHUNT state, the forward protection stage count α management counter 12 increments the count value $Q_\alpha$. The forward protection stage count α management counter 12 is reset if it detects when the logical product of the frame synchronization pattern detection signal FDET and the enable signal ENSET becomes "1" (FDET & ENSET=1) in the SYNC state or the PREHUNT state. The forward protection stage count α management counter 12 is also reset when not in the SYNC state or the PREHUNT state or when the system reset signal RESETB is "0".

Figure 7:
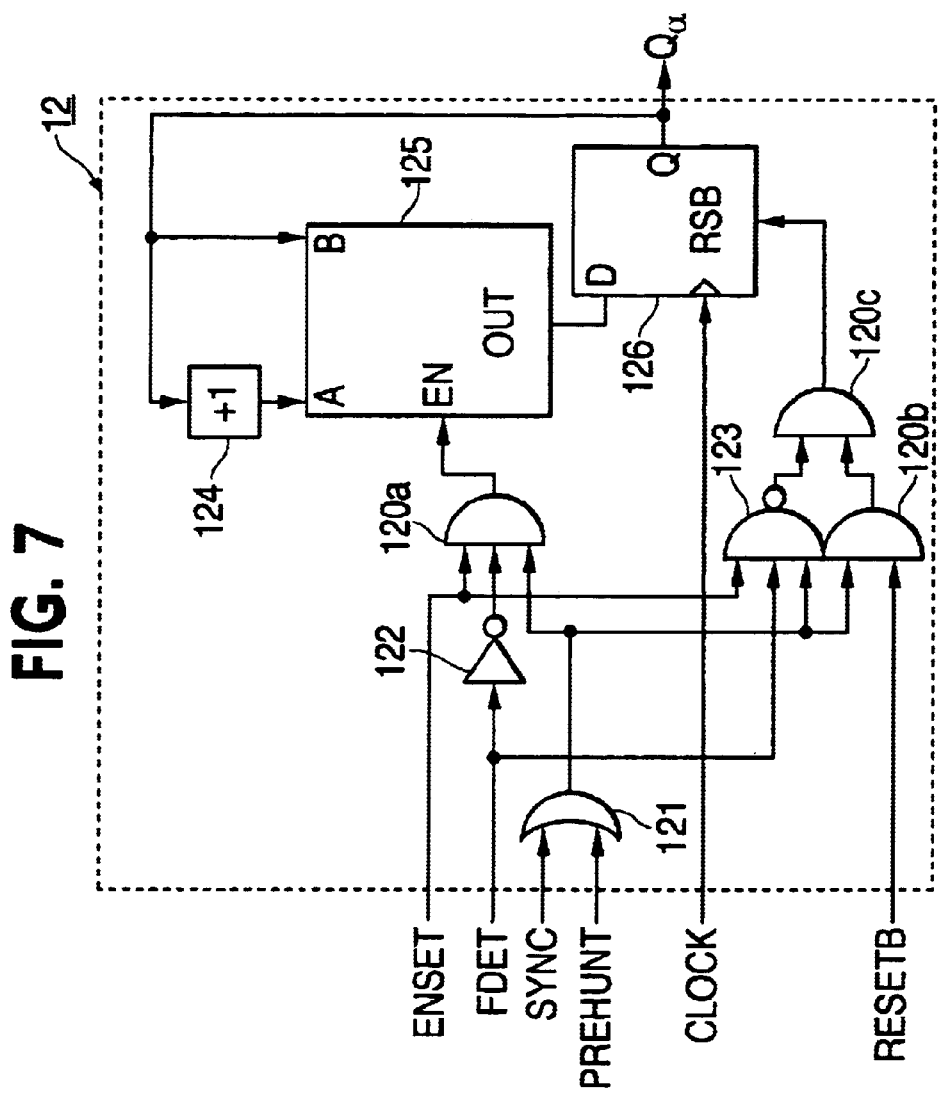
FIG. 7 is a block diagram of a forward protection stage count α management counter in the frame synchronization state transition management circuit shown in FIG. 5.

Specific details of the forward protection stage count α management counter 12 are shown in FIG. 7. As shown in FIG. 7, the forward protection stage count α management counter 12 comprises AND gates 120a–120c, an OR gate 121, an inverter 122, a NAND gate 123, a counter 124, a selector 125, and a data flip-flop 126 with a reset terminal.

The OR gate 121 ORs the synchronization state signal SYNC and the pre-hunting state signal PREHUNT. The AND gate 120a ANDs the enable signal ENSET, an output signal, which is in inverse relation to the frame synchronization pattern detection signal FDET, from the inverter 122, and an output signal from the OR gate 121. An output signal from the AND gate 120a is supplied to an input terminal EN of the selector 125.

The NAND gate 123 NANDs the enable signal ENSET, the frame synchronization pattern detection signal FDET, and the output signal from the OR gate 121. The AND gate 120b ANDs the output signal from the OR gate 121 and the system reset signal RESETB. The AND gate 120c ANDs an output signal from the NAND gate 123 and an output signal from the AND gate 120b.

The selector 125 has an input terminal A supplied with an output signal Q from the data flip-flop 126 via the counter 124 and an input terminal B supplied with the output signal Q from the data flip-flop 126. The data flip-flop 126 has an input terminal D supplied with an output from the selector 125 and an input terminal RSB supplied with an output signal from the AND gate 120c. The output signal Q from the data flip-flop 126 is outputted as the count value $Q_\alpha$.

Arrangement of the State Transition Block 20:

The hunting state signal output circuit 21 is supplied with the frame synchronization pattern detection signal FDET from the frame synchronization pattern detecting circuit 1, the synchronization state signal SYNC from the synchronization state signal output circuit 22, the pre-synchronization state signal PRESYNC from the pre-synchronization state signal output circuit 23, the pre-hunting state signal PREHUNT from the pre-hunting state signal output circuit 24, and the output signals from the backward protection stage count δ management counter 11 and the forward protection stage count α management counter 12. The hunting state signal output circuit 21 outputs the hunting state signal HUNT when in the hunting state.

Figure 8:
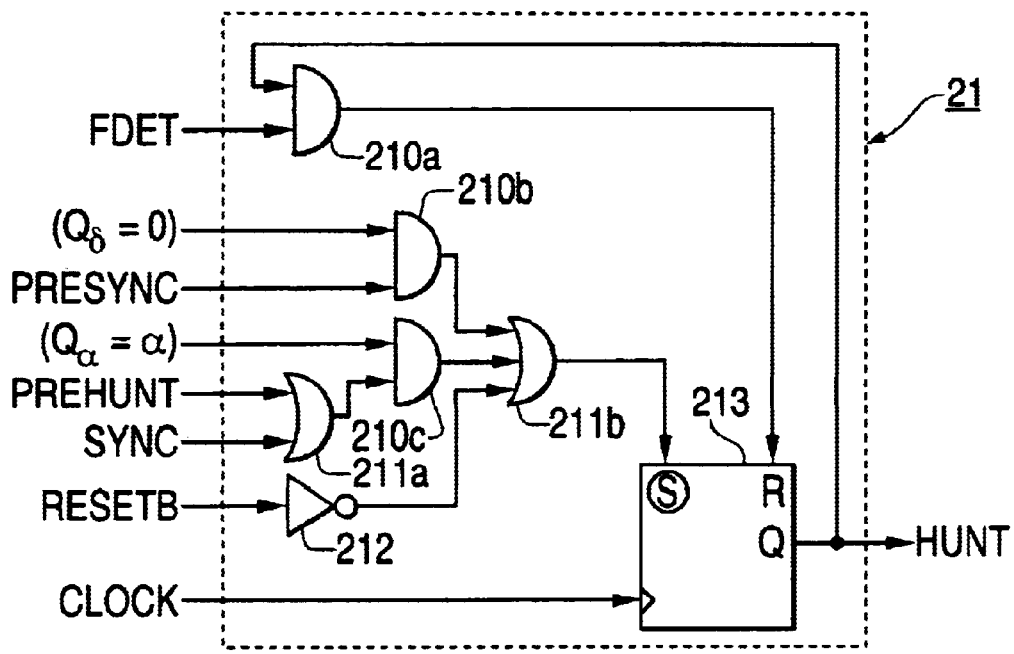
FIG. 8 is a block diagram of a hunting state signal output circuit in the frame synchronization state transition management circuit shown in FIG. 5.

Specific details of the hunting state signal output circuit 21 are shown in FIG. 8. As shown in FIG. 8, the hunting state signal output circuit 21 comprises AND gates 210a–210c, OR gates 211a, 211b, an inverter 212, and a set-reset flip-flop 213 in which the set is taken priority.

The AND gate 210a ANDs the frame synchronization pattern detection signal FDET and an output signal Q from the set-reset flip-flop 213, and an output signal thereof is supplied to a reset terminal R of the set-reset flip-flop 213.

The AND gate 210b has an input terminal supplied with the count value $Q_\alpha=0$ and another input terminal supplied with the pre-synchronization state signal PRESYNC, and ANDs these supplied signals. The OR gate 211a ORs the pre-hunting state signal PREHUNT and the synchronization state signal SYNC. The AND gate 210c has an input terminal supplied with the count value $Q_\alpha=\alpha$ (arbitrary setting) and another input terminal supplied with an output signal from the OR gate 211a, and ANDs these supplied signals. The OR gate 211b ORs an output signal from the AND gate 210b, the output signal from the OR gate 211a, and an output signal, which is in inverse relation to the system reset signal RESETB, from the inverter 212. An output signal from the gate 211b is supplied to a set terminal S of the set-reset flip-flop 213. The set-reset flip-flop 213 outputs the hunting state signal HUNT as its output signal Q.

The pre-synchronization state signal output circuit 23 is supplied with the frame synchronization pattern detection signal FDET from the frame synchronization pattern detecting circuit 1, the hunting state signal HUNT from the hunting state signal output circuit 21, and the output signal from the backward protection stage count δ management counter 11. The pre-synchronization state signal output circuit 23 outputs the pre-synchronization state signal PRESYNC when in the pre-synchronization state.

Figure 9:
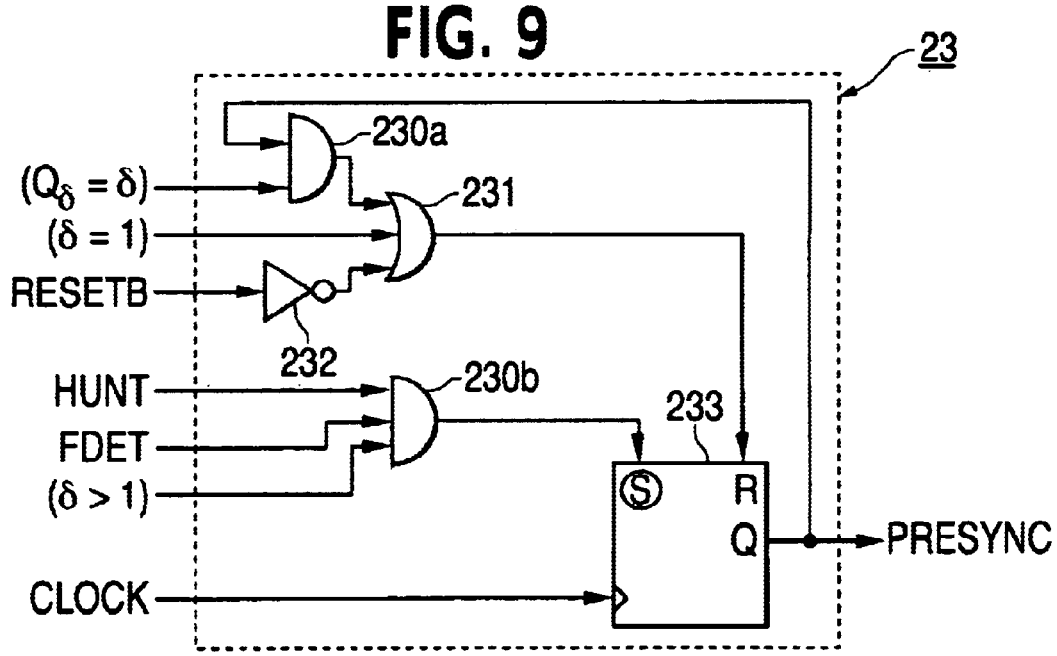
FIG. 9 is a block diagram of a pre-synchronization state signal output circuit in the frame synchronization state transition management circuit shown in FIG. 5.

Specific details of the pre-synchronization state signal output circuit 23 are shown in FIG. 9. As shown in FIG. 9, the pre-synchronization state signal output circuit 23 comprises AND gates 230a, 230b, an OR gate 231, an inverter 232, and a set-reset flip-flop 233 in which the reset is taken priority.

The AND gate 230a has an input terminal supplied with the count value $Q_\delta=\delta$ (arbitrary setting) and another input terminal supplied with an output signal Q from the set-reset flip-flop 233, and ANDs these supplied signals. The OR gate 231 has an input terminal supplied with the count value $\delta=1$ and other two input terminals supplied with an output signal from the AND gate 230a and an output signal, which is in inverse relation to the system reset signal RESETB, from the inverter 232, and ORs these three supplied signals. An output signal from the OR gate 231 is supplied to a reset terminal R of the set-reset flip-flop 233.

The AND gate 230b has an input terminal supplied with the count value $\delta>1$ and two other input terminals supplied with the hunting state signal HUNT and the frame synchronization pattern detection signal FDET, and ANDs these three supplied signals. An output signal from the AND gate 230b is supplied to a set terminal S of the set-reset flip-flop 233. The set-reset flip-flop 233 outputs the pre-synchronization state signal PRESYNC as its output signal Q.

The synchronization state signal output circuit 22 is supplied with the frame synchronization pattern detection signal FDET from the frame synchronization pattern detecting circuit 1, the hunting state signal HUNT from the hunting state signal output circuit 21, the pre-synchronization state signal PRESYNC from the pre-synchronization state signal output circuit 23, and the output signals from the backward protection stage count δ management counter 11 and the forward protection stage count α management counter 12. The synchronization state signal output circuit 22 outputs the synchronization state signal SYNC when in the synchronization state.

Specific details of the synchronization state signal output circuit 22 are shown in FIG. 10. As shown in FIG. 10, the synchronization state signal output circuit 22 comprises AND gates 220a–220d, OR gates 221a, 221b, an inverter 222, and a set-reset flip-flop 223 in which the reset is taken priority.

The AND gate 220a has an input terminal supplied with the count value $Q_\alpha=1$ and another input terminal supplied with an output signal Q from the set-reset flip-flop 223, and ANDs these supplied signals. The OR gate 221a ORs an output signal from the AND gate 220a and an output signal, which is in inverse relation to system reset signal RESETB, from the inverter 222. An output signal from the OR gate 221a is supplied to a reset terminal R of the set-reset flip-flop 223.

The AND gate 220b has an input terminal supplied with the count value $Q_\alpha=0$ and another input terminal supplied with the output signal Q from the set-reset flip-flop 223, and ANDs these supplied signals. The AND gate 220c has an input terminal supplied with the count value $Q_\delta=\delta$ (arbitrary setting) and another input terminal supplied with the pre-synchronization state signal PRESYNC, and ANDs these supplied signals. The AND gate 220d has an input terminal supplied with the count value $\delta=1$ and other two input terminals supplied with the hunting state signal HUNT and the frame synchronization pattern detection signal FDET, and ANDs these three supplied signals.

The OR gate 221b is supplied with output signals from the AND gates 220b–220d, and ANDs these three supplied signals. An output signal from the OR gate 221b is supplied to a set terminal S of the set-reset flip-flop 223. The set-reset flip-flop 223 outputs the synchronization state signal SYNC as its output signal Q.

The pre-hunting state signal output circuit 24 is supplied with the frame synchronization pattern detection signal FDET from the frame synchronization pattern detecting circuit 1, the synchronization state signal SYNC from the synchronization state signal output circuit 22, and the output signal from the forward protection stage count α management counter 12. The pre-hunting state signal output circuit 24 outputs the pre-hunting state signal PREHUNT when in the pre-hunting state.

Specific details of the pre-hunting state signal output circuit 24 are shown in FIG. 11. As shown in FIG. 11, the pre-hunting state signal output circuit 24 comprises AND gates 240a–240c, OR gates 241a, 241b, an inverter 242, and a set-reset flip-flop 223 in which the reset is taken priority.

The AND gate 240a has an input terminal supplied with the count value $Q_\alpha=0$ and another input terminal supplied with an output signal Q from the set-reset flip-flop 243, and ANDs these supplied signals. The OR gate 241a ORs an output signal Q from the set-reset flip-flop 243 and the synchronization state signal SYNC from the synchronization state signal output circuit 22.

The AND gate 240b has an input terminal supplied with the count value $Q_\alpha=\alpha$ and another input terminal supplied with an output signal from the OR gate 241a, and ANDs these supplied signals. The OR gate 241b has an input terminal supplied with the count value α=0 and other three input terminals supplied with output signals from the AND gates 240a, 240b and a signal outputted from the inverter 242 by inverting the system reset signal RESETB, and ORs these four supplied signals. An output signal from the OR gate 241b is supplied to a reset terminal R of the set-reset flip-flop 243.

The AND gate 240c has an input terminal supplied with the count value $Q_\alpha=1$ and other two input terminals supplied with the count value α>1 and the synchronization state signal SYNC from the synchronization state signal output circuit 22, and ANDs these supplied signals. An output from the AND gate 240c is supplied to a set terminal S of the set-reset flip-flop 243. The set-reset flip-flop 243 outputs the pre-hunting state signal PREHUNT as its output signal Q.

Operation (outputs) in various state transitions of the components of the state transition block 20 will specifically be described below. Modes of operation with respect to the settings of the backward protection stage count δ>1 and the forward protection stage count α>1 and also with respect to the settings of the backward protection stage count δ=1 and the forward protection stage count α=1 will be described below.

(1) With respect to the backward protection stage count δ>1 and the forward protection stage count α>1:

FIG. 12 shows the output timing of state transition signals HUNT, PRESYNC, SYNC, PREHUNT. The operation will be described below with reference to FIG. 12.

<Transition From the HUNT State>

If the frame synchronization pattern detecting circuit 1 detects the frame synchronization pattern (A1, A2) from received frame data supplied to the input terminal DI in the HUNT state, then the frame synchronization pattern detecting circuit 1 outputs the frame synchronization pattern detection signal FDET to the frame synchronization state transition managing circuit 3. When the frame synchronization state transition managing circuit 3 receives the frame synchronization pattern detection signal FDET, i.e., it detects when the frame synchronization pattern detection signal FDET becomes active, the frame synchronization state changes from the HUNT state (default state) to the PRESYNC state. At this time, the state transition signals in the components of the state transition block 20 and the count value change as follows (see a point 1 in FIG. 12):

$Q_\delta$: 0→1
$Q_\alpha$: 0→1
HUNT: 1→0
PRESYNC: 0→1
SYNC: 0→0
PREHUNT: 0→0
OOF: 1→1

If the frame synchronization pattern detecting circuit 1 does not detect the frame synchronization pattern (A1, A2) in the HUNT state, then since the frame synchronization pattern detection signal FDET from the frame synchronization pattern detecting circuit 1 does not go active, the frame synchronization state remains to be the HUNT state. At this time, the state transition signals in the components of the state transition block 20 and the count value change as follows (see a point 5 in FIG. 12):

$Q_{67}$: 0→0
$Q_\alpha$: 0→0
HUNT: 1→1
PRESYNC: 0→0
SYNC: 0→0
PREHUNT: 0→0
OOF: 1→1

<Transition From the PRESYNC State>

If the frame synchronization state transition managing circuit 3 detects "FDET & ENSET=1" consecutively (δ−1) times in the PRESYNC state, then the frame synchronization state changes from the PRESYNC state to the SYNC state. At this time, the state transition signals in the components of the state transition block 20 and the count value change as follows (see a point 2 in FIG. 12):

$Q_\delta$: 0→δ0
$Q_\alpha$: 0→0
HUNT: 0→0
PRESYNC: 1→0
SYNC: 0→1
PREHUNT: 0→0
OOF: 1→0

If the frame synchronization state transition managing circuit 3 fails to detect "FDET & ENSET=1" consecutively (δ−1) times in the PRESYNC state, then the frame synchronization state changes from the PRESYNC state to the HUNT state. At this time, the state transition signals in the components of the state transition block 20 and the count value change as follows (see a point 6 in FIG. 12):

$Q_\delta$: $(1 \leq Q_\delta < \delta)$→0
$Q_\alpha$: 0→0
HUNT: 0→1
PRESYNC: 1→0
SYNC: 0→0
PREHUNT: 0→0
OOF: 1→1

<Transition From the SYNC State>

If the frame synchronization state transition managing circuit 3 detects "not FDET & ENSET=1" in the SYNC state, then the frame synchronization state changes from the SYNC state to the PREHUNT state. At this time, the state transition signals in the components of the state transition block 20 and the count value change as follows (see a point 3 in FIG. 12):

$Q_\delta$: 0→0
$Q_\alpha$: 0→1
HUNT: 0→0
PRESYNC: 0→0
SYNC: 1→0
PREHUNT: 0→1
OOF: 0→0

If the frame synchronization state transition managing circuit 3 detects "FDET & ENSET=1" in the SYNC state, then the frame synchronization state remains to be the SYNC state. At this time, the state transition signals in the components of the state transition block 20 and the count value change as follows (see a point 7 in FIG. 12):

$Q_\delta$: 0→0
$Q_\alpha$: 0→0
HUNT: 0→0
PRESYNC: 0→0
SYNC: 1→1
PREHUNT: 0→0
OOF: 0→0

Transition From the PREHUNT State>

If the frame synchronization state transition managing circuit 3 detects "not FDET & ENSET=1" consecutively ($\alpha$−1) times in the PREHUNT state, then the frame synchronization state changes from the PREHUNT state to the HUNT state. At this time, the state transition signals in the components of the state transition block 20 and the count value change as follows (see a point 4 in FIG. 12):

$Q_\delta$: 0→0
$Q_\alpha$: 1→$\alpha$→0
HUNT: 0→1
PRESYNC: 0→0
SYNC: 0→0
PREHUNT: 1→0
OOF: 0→1

If the frame synchronization state transition managing circuit 3 detects "FDET & ENSET=1" in the PREHUNT state, then the frame synchronization state changes from the PREHUNT state to the SYNC state. At this time, the state transition signals in the components of the state transition block 20 and the count value change as follows (see a point 8 in FIG. 12):

$Q_\delta$: 0→0
$Q_\alpha$: (1≦$Q_\alpha$<$\alpha$)→0
HUNT: 0→0
PRESYNC: 0→0
SYNC: 0→1
PREHUNT: 1→0
OOF: 0→0

(2) With respect to the backward protection stage count $\delta$=1 and the forward protection stage count $\alpha$=1:

FIG. 13 shows the output timing of state transition signals HUNT, PRESYNC, SYNC, PREHUNT. The operation will be described below with reference to FIG. 13.

<Transition From the HUNT State>

If the frame synchronization pattern detecting circuit 1 detects the frame synchronization pattern (A1, A2) from received frame data supplied to the input terminal DI in the HUNT state, then the frame synchronization pattern detecting circuit 1 outputs the frame synchronization pattern detection signal FDET to the frame synchronization state transition managing circuit 3. When the frame synchronization state transition managing circuit 3 detects when the frame synchronization pattern detection signal FDET becomes active, the frame synchronization state changes from the HUNT state (default state) to the SYNC state, skipping the PRESYNC state. At this time, the state transition signals in the components of the state transition block 20 and the count value change as follows (see a point 1 in FIG. 13):

$Q_\delta$: 0→1→0
$Q_\alpha$: 0→0
HUNT: 1→0
PRESYNC: 0→0
SYNC: 0→1
PREHUNT: 0→0
OOF: 1→0

If the frame synchronization pattern detecting circuit 1 does not detect the frame synchronization pattern (A1, A2) in the HUNT state, then since the frame synchronization pattern detection signal FDET from the frame synchronization pattern detecting circuit 1 does not go active, the frame synchronization state remains to be the HUNT state. At this time, the state transition signals in the components of the state transition block 20 and the count value change as follows (see a point 3 in FIG. 13):

$Q_\delta$: 0→0
$Q_\alpha$: 0→0
HUNT: 1→1
PRESYNC: 0→0
SYNC: 0→0
PREHUNT: 0→0
OOF: 1→1

<Transition From the SYNC State>

If the frame synchronization state transition managing circuit 3 detects "not FDET & ENSET=1" in the SYNC state, then the frame synchronization state changes from the SYNC state to the HUNT state, skipping the PREHUNT state. At this time, the state transition signals in the components of the state transition block 20 and the count value change as follows (see a point 2 in FIG. 13):

$Q_\delta$: 0→0
$Q_\alpha$: 0→1
HUNT: 0→0
PRESYNC: 0→0
SYNC: 1→0
PREHUNT: 0→1
OOF: 0→0

If the frame synchronization state transition managing circuit 3 detects "FDET & ENSET=1" in the SYNC state, then the frame synchronization state remains to be the SYNC state. At this time, the state transition signals in the components of the state transition block 20 and the count value change as follows (see a point 4 in FIG. 13):

$Q_\delta$: 0→0
$Q_\alpha$: 0→0
HUNT: 0→0
PRESYNC: 0→0
SYNC: 1→1

PREHUNT: 0→0
OOF: 0→0

An arrangement for setting up the forward protection stage count α and the backward protection stage count δ in the frame synchronization circuit will be described below.

Figure 14:
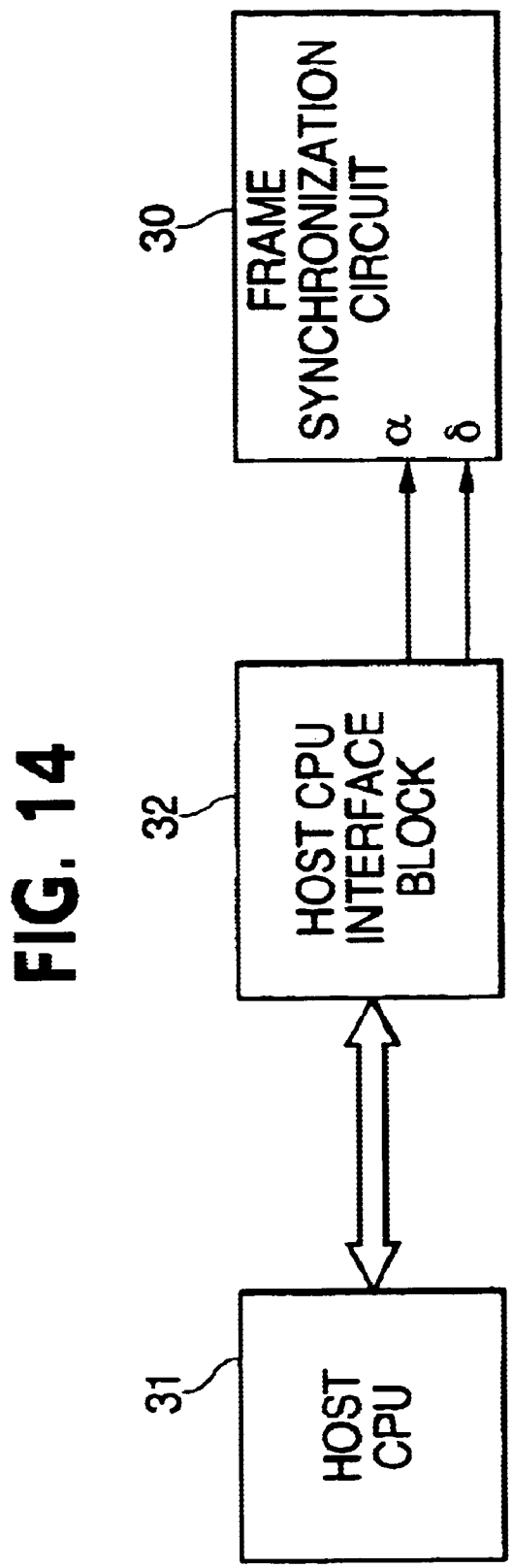
FIG. 14 is a block diagram of a system in which a forward protection stage count α and a backward protection stage count δ can be set up.

The arrangement of a system capable of setting up the forward protection stage count α and the backward protection stage count δ is shown in FIG. 14. The system shown in FIG. 14 includes a host CPU interface block 32 connected to a frame synchronization circuit 30 according to the embodiment, and a host CPU 31 connected to the host CPU interface block 32 by a data bus. The system allows the forward protection stage count α and the backward protection stage count δ to be set up from the host CPU 31 by way of digital access.

FIG. 15 shows the arrangement of another system capable of setting up the forward protection stage count α and the backward protection stage count δ. The system shown in FIG. 15 includes an external terminal interface block 41 connected to a frame synchronization circuit 40 according to the embodiment, the external terminal interface block 41 being connected to an external input terminal connected to an external input device. The system allows the forward protection stage count α and the backward protection stage count δ to be set up from the external input device.

According the embodiment of the present invention, as described above, since the backward protection stage count and the forward protection stage count can be set to arbitrary values as desired, the user may reduce the backward protection stage count and the forward protection stage count for shortening a period of time required to confirm frame synchronization state transitions, or increase the backward protection stage count and the forward protection stage count for increased reliability of frame synchronization state transitions.

While preferred embodiments of the present invention have been described using specific terms, such description is for illustrative purposes only, and it is to be understood that changes and variations may be made without departing from the spirit or scope of the following claims.

What is claimed is:

1. A method of achieving frame synchronization for received frame data with a predetermined frame synchronization pattern inserted in the beginning of each of transmission frames containing ATM cells in a frame synchronization circuit, comprising the steps of:

detecting the frame synchronization pattern from the received frame data;

generating a first pulse signal of one clock pulse in timed relationship to the detection of the frame synchronization pattern from the received frame data;

detecting a transition from a hunting state to one of pre-synchronization state, a synchronization state, and a pre-hunting state for frame synchronization of the frame synchronization circuit;

generating a second pulse signal in a period corresponding to a frame period of the received frame data in timed relationship to the detection of said transition;

managing the number of times that the frame synchronization pattern is detected and the number of times that the frame synchronization pattern is not detected, based on the first pulse signal and the second pulse signal;

making a transition from the hunting state to the synchronization state if the frame synchronization pattern is detected consecutively for a backward protection stage count which is voluntarily set up as a protection condition to be met in order to change from the hunting state to the synchronization state; and making a transition from the synchronization state to the hunting state if the frame synchronization pattern is not detected consecutively for a forward protection stage count which is voluntarily set up as a protection condition to be met in order to change from the synchronization state to the hunting state.

2. A frame synchronization circuit for achieving frame synchronization for received frame data with a predetermined frame synchronization pattern inserted in the beginning of each of transmission frames containing ATM cells, comprising:

frame synchronization pattern detecting means for detecting the frame synchronization pattern from the received frame data and generating a first pulse signal of one clock pulse in timed relationship to the detection of the frame synchronization pattern from the received frame data;

frame synchronization state transition managing means for managing frame synchronization state transitions; and frame timing generating means for detecting a transition from a hunting state to another state for frame synchronization, and generating a second pulse signal in a period corresponding to a frame period of the received frame data in timed relationship to the detection of said transition;

said frame synchronization state transition managing means comprising means for managing the number of times that the frame synchronization pattern is detected and the number of times that the frame synchronization pattern is not detected, based on the first pulse signal and the second pulse signal, and making a transition from the hunting state to a synchronization state if the frame synchronization pattern is detected consecutively for a backward protection stage count which is voluntarily set up as a protection condition to be met in order to change from the hunting state to the synchronization state, and making a transition from the synchronization state to the hunting state if the frame synchronization pattern is not detected consecutively for a forward protection stage count which is voluntarily set up as a protection condition to be met in order to change from the synchronization state to the hunting state.

3. A frame synchronization circuit according to claim 2, wherein said frame synchronization state transition managing means comprises:

counter means for managing the number of times that the frame synchronization pattern is detected and the number of times that the frame synchronization pattern is not detected, based on the first pulse signal and the second pulse signal; and state transition performing means for comparing the backward protection stage count and the forward protection stage count with a count value of said counter means, and generating state signals representing four states including a hunting state, a pre-synchronization state, a synchronization state, and a pre-hunting state for frame synchronization, respectively, depending on a compared result.

4. A frame synchronization circuit according to claim 3, wherein said counter means comprises:

first counting means for managing the number of times that the frame synchronization pattern is detected in the hunting state and the pre-synchronization state; and second counting means for managing the number of times that the frame synchronization pattern is not detected in the synchronization state and the pre-hunting state;

said state transition performing means comprising means for generating a state signal representing a transition to the synchronization state if the backward protection stage count and a count value of said first counting means agree with each other, and generating a state signal representing a transition to the hunting state if the forward protection stage count and a count value of said second counting means agree with each other.

5. A frame synchronization circuit according to claim 2, further comprising an interface connectable to an external host CPU for allowing the backward protection stage count and the forward protection stage count to be set up from said external host CPU via said interface.

6. A frame synchronization circuit according to claim 3, further comprising an interface connectable to an external host CPU for allowing the backward protection stage count and the forward protection stage count to be set up from said external host CPU via said interface.

7. A frame synchronization circuit according to claim 4, further comprising an interface connectable to an external host CPU for allowing the backward protection stage count and the forward protection stage count to be set up from said external host CPU via said interface.

8. A frame synchronization circuit according to claim 2, further comprising an interface connectable to an external input terminal connected to an external input device for allowing the backward protection stage count and the forward protection stage count to be set up from said external input device via said interface.

9. A frame synchronization circuit according to claim 3, further comprising an interface connectable to an external input terminal connected to an external input device for allowing the backward protection stage count and the forward protection stage count to be set up from said external input device via said interface.

10. A frame synchronization circuit according to claim 4, further comprising an interface connectable to an external input terminal connected to an external input device for allowing the backward protection stage count and the forward protection stage count to be set up from said external input device via said interface.

* * * * *